Figure 5:
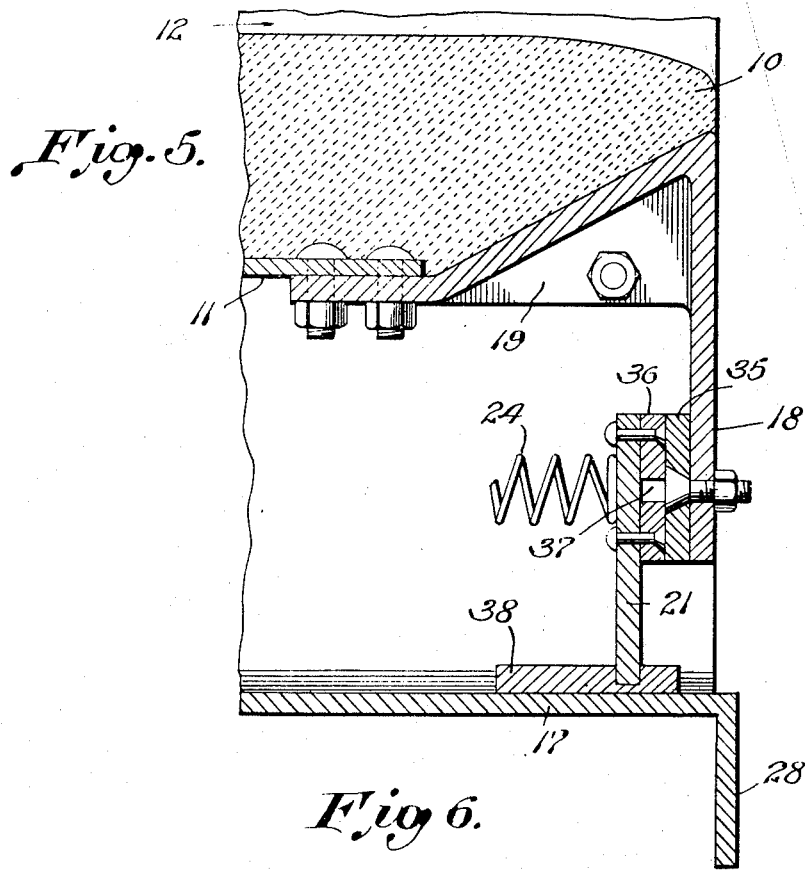

Jan. 20, 1948. J. B. GAFFNEY 2,434,845
COOLING MEANS FOR ROTARY KILN NOSE RINGS
Filed Dec. 15, 1943 3 Sheets-Sheet 1
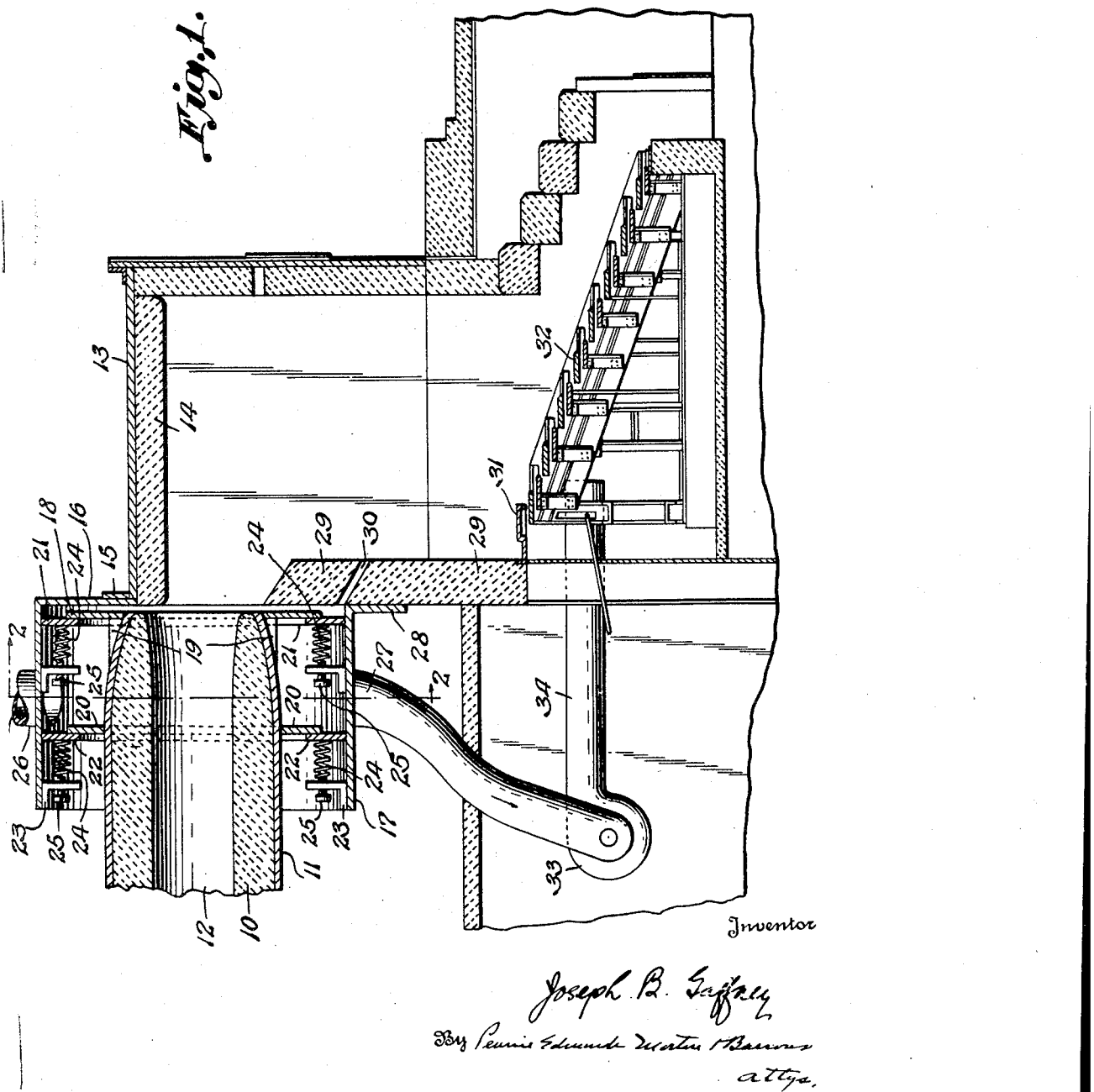
Inventor
Joseph B. Gaffney
By Pennie Edmonds Morton & Barrows
Attys.

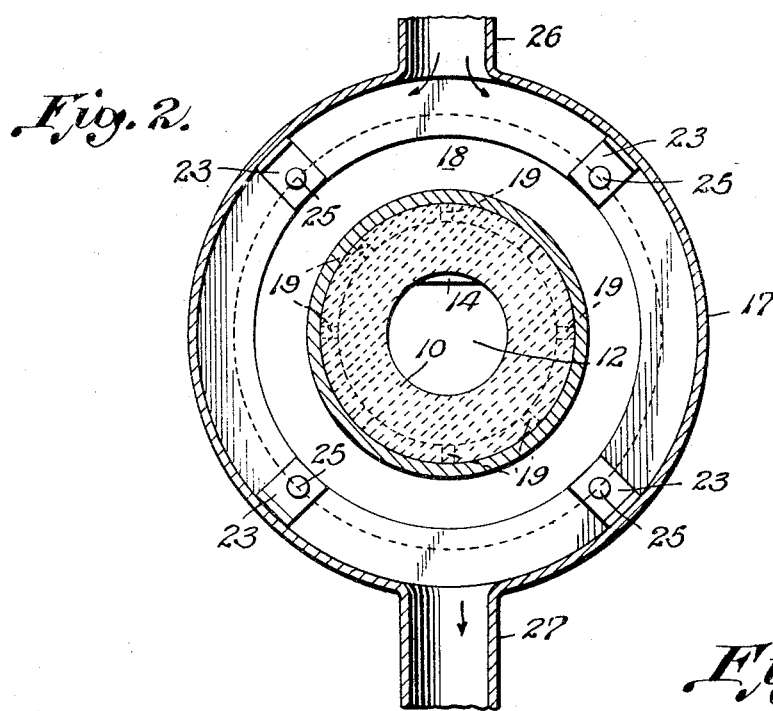
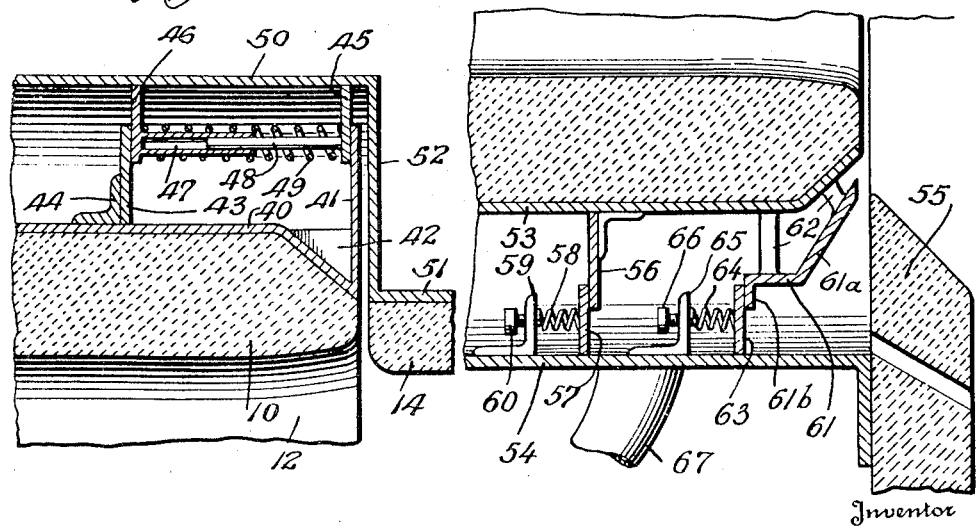

Jan. 20, 1948.  J. B. GAFFNEY  2,434,845
COOLING MEANS FOR ROTARY KILN NOSE RINGS
Filed Dec. 15, 1943  3 Sheets-Sheet 3

Inventor
Joseph B. Gaffney
By Pennie Edmonds Morton Barrows
attys

Patented Jan. 20, 1948

2,434,845

UNITED STATES PATENT OFFICE 2,434,845

COOLING MEANS FOR ROTARY KILN NOSE RINGS

Joseph B. Gaffney, Hokendauqua, Pa., assignor to Fuller Company, Borough of Catasauqua, Pa., a corporation of Delaware Application December 15, 1943, Serial No. 514,367

8 Claims. (Cl. 263—44)

This invention relates to rotary kilns, such as are used in burning cement raw materials to produce clinker, and is concerned more particularly with a novel cooling means for cooling the nose-ring of such a kiln. The new construction serves to protect the ring and its refractory lining against damage from excessive heat, and, in addition, it acts to seal the discharge end of the kiln against leakage so that secondary air for combustion may be admitted into the kiln under better control than heretofore.

The cooling and sealing means of the invention is of special utility in connection with kilns operating with an associated air quenching cooler for the production of Portland cement clinker of high "glass" content, that is, clinker in which a high proportion of the constituents of the liquid phase have been solidified as an undercooled liquid. The new apparatus, however, offers advantages when used in connection with the treatment of other materials, as, for example, in the burning of lime and the roasting of ores, commonly processed in rotary kilns.

For the production of Portland cement clinker of high glass content, it is generally believed by cement chemists that the clinker, burned at a temperature of substantially 2700 degrees F., must be abruptly cooled to a temperature below 2350 degrees F. within two to three minutes to prevent compounds from crystallizing from solution. Such operation requires that the burning zone be at or near the discharge end of the kiln, so that the clinker discharging from the kiln can be subjected to abrupt cooling, preferably by subjecting it to rapid air-quenching.

Such a burning operation imposes unusual and extreme temperature conditions upon the metal and refractories adjacent the discharge end of the kiln, particularly upon the nose-ring and nose-ring brick, and the usual kiln seals of heat resisting metal cannot withstand the excessive temperatures now encountered. Even with fluid cooling, the nose-ring of kilns used in such operations tends to flare outwardly, generally in a funnel shape, with the result that the large nose-ring bricks are released and fall from position. Previous devices also permit the large bricks to be heated unevenly with resultant rapid disintegration.

To overcome these mechanical difficulties as well as to allow for the substantial eccentricity of rotation inherent in such a device as a rotary kiln, it has been the practice to seal the discharge end of the kiln only to a partial extent and to leave a space between the end of the kiln and its hood through which a substantial quantity of atmospheric air may be drawn by the natural or induced draft of the kiln. This air is intended to reduce the temperature of the nose-ring and refractories and thus retard their rate of destruction and it is frequently necessary to employ quantities of as much as half of the total air supply to the kiln as leakage to permit practical operation.

In present rotary kilns with associated quenching equipment, it is customary to supply quantities of air in excess of that theoretically necessary to burn the fuel because of variations in the rate at which combustion air is drawn into the kiln and this practice is adopted partly because of the variable resistance encountered by the air in flowing through the equipment into the kiln. When leakage between the kiln and the hood as above mentioned is permitted, the quantity of excess air admitted to avoid the possibility of operating with a reducing flame, as when the draft is very low, must be increased because the leakage is not subject to positive control. It will be readily apparent that, under such conditions, the clinker cannot be uniformly well burned and that recuperation of the sensible heat from the clinker through the preheating of combustion air is inefficient because only a relatively small part of the air can be passed through the clinker. It necessarily follows that the cooling of the clinker is delayed, with resultant harmful crystallization, and that, in addition, fuel is wasted.

The present invention is, accordingly, directed to the provision of means by which the nose-ring of a rotary kiln may be cooled by atmospheric air and a seal may be maintained between the kiln and its hood so that leakage of air into the kiln may be avoided. The cooling and sealing means of the invention are so constructed that the cooling air is under quantity control and the air, after having absorbed heat in its cooling action, may be employed, if desired, to cool the clinker and then be used as secondary air for combustion. The new cooling means causes heat to be taken up rapidly from the nose-ring and the ring may, accordingly, be so constructed as to retain refractory bricks of narrow width without loss during operation. Also, the nose-ring, when cooled by the new means, expands and contracts evenly so that destructive internal stresses occurring in present equipment are avoided.

The kiln nose-ring employed in the practice of the invention preferably comprises a cylindrical section terminating in a section of tapering generally truncated conical form, the latter section retaining the nose brick in place. The conical section of the ring lies within a casing and means mounted in part on the casing and in part on the nose-ring cooperate to define a chamber through which air may be passed. If desired, atmospheric air may be drawn through the chamber to take up heat from the nose-ring and cool the latter, after which the air is introduced into the clinker cooler. In another construction, air is forced into the chamber and allowed to escape around the end edge of the nose-ring. In both constructions, the air maintains the nose-ring cool and is heated in that operation and the air may then be used directly as secondary air for combustion or may be used for clinker cooling and then supplied to the kiln.

Figure 6:
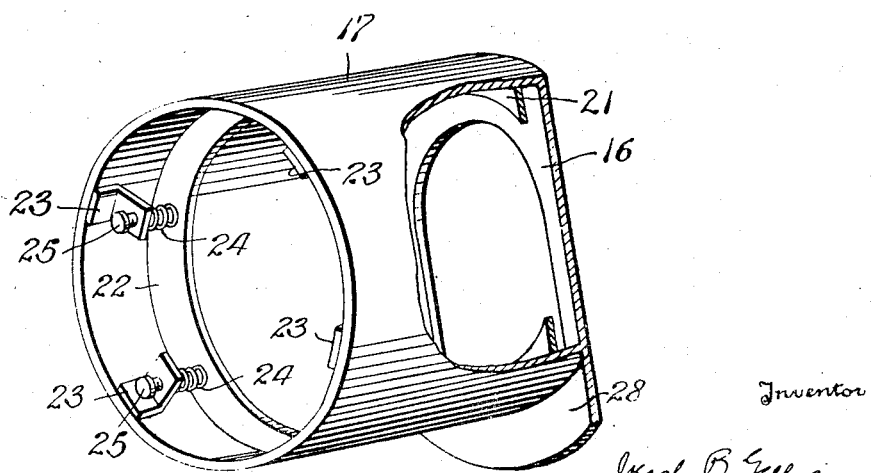

For a better understanding of the invention, reference may be had to the accompanying drawings, in which Fig. 1 is a vertical sectional view of one embodiment of the invention;

Fig. 2 is a sectional view on the line 2—2 of Fig. 1;

Figs. 3, 4, and 5 are, respectively, fragmentary sectional views similar to Fig. 1 and showing modified constructions; and Fig. 6 is a view in perspective of the casing forming part of the cooling means.

In the construction illustrated in Fig. 1, a rotary kiln having a refractory lining 10 is provided at its discharge end with a nose-ring 11 of suitable metal which need not have special heat resistance characteristics and is formed with an inwardly directed end portion. The material being burned or roasted, such as cement raw materials, passes through the hollow central portion 12 of the kiln and is discharged from the end of the nose-ring into a kiln hood which includes a casing 13 provided with a lining 14. The casing 13 has a flange 15 to which is attached a wall 16 of a casing 17. The nose-ring terminates close to the plane of the wall 16 and at its end, the nose-ring carries a flat ring 18 which is braced by triangular ribs 19 extending lengthwise of the kiln. A second flat ring 20 is also mounted on the nose-ring at a distance from the first and held in place in any suitable way.

The casing 17 completely encircles the nose-ring and on its inner wall are mounted a pair of flat rings 21 and 22 which are forced into contact with rings 18 and 20, respectively, to form a seal. For the purpose of holding the pairs of rings in contact, a pair of angle backing members 23 are mounted on the inner wall of the casing and springs 24 are disposed between each backing member and its associated ring 21, 22. The force of the springs is adjustable by means of adjusting screws 25 mounted in the backing members 23.

The casing 17, the pairs of rings 18, 21 and 20, 22 and the outer surface of the nose-ring define an air chamber having an air inlet 26 and an air outlet 27. The casing has a depending flange 28 bearing against the wall 29 of the clinker cooling chamber and this wall of the chamber is formed with a steeply inclined channel 30 extending through it and leading from the interior of the casing just above flange 28. Within the clinker cooling chamber is a step 31 and grates 32 which receive the hot clinker as it is discharged from the kiln. The outlet 27 from the cooling chamber within the casing leads to the intake of a fan or blower 33, the outlet of which is connected to a conduit 34 which extends into the clinker cooling chamber beneath the grates 32.

In the construction shown in Fig. 1, the rings 18, 20 make direct contact with the rings 21, 22, respectively, but, if desired, the contacting surfaces may be provided with wear strips. Such a construction is illustrated in Fig. 5 in which ring 18 is shown as provided with a wear strip 35, which is readily replaceable, and ring 21 is provided with a similar strip 36 contacting with a strip 35 and formed with an annular channel 37 for a lubricant. Rings 21 and 22 are preferably provided with a sliding base, such as base 38 shown in Fig. 5, which is movable along the inner surface of the casing.

In the construction shown in Fig. 3, the nose-ring 40 is formed with an integral flat end ring 41 braced by stiffening ribs 42 and the second flat ring 43 on the nose-ring is held in place by an angle support 44. Between the rings 41 and 43 are mounted annular members 45, 46 which are urged apart and against the respective rings 41, 43 by resilient means, including telescoping members 47, 48 encircled by spring 49. A casing or air bustle 50 encloses the nose-ring and flat annular members 45, 46 are mounted in sliding contact with the inner surface of the casing. The casing is shown as integrally connected to the hood casing 51 by means of a connecting wall 52.

In the Fig. 4 construction, the nose-ring 53 lies within a casing 54 similar to casing 17 of the Fig. 1 construction and mounted on a wall 55. The nose-ring is provided with a flat ring 56 which makes sliding contact with a ring 57 mounted within the casing and urged against ring 56 by a spring 58 mounted in an angle backing member 59, the force of the spring being adjustable by a screw 60. Near its end, the nose-ring carries a ring 61 mounted on arms 62. Ring 61 has a portion 61a which lies separated from the conical end portion of the nose-ring and with it defines an annular passage through which air may flow. Ring 61 has a flange 61b against which a ring 63 is forced by a spring 64 bearing at one end against an angle backing member 65, the force of the spring being regulated by a screw 66 mounted in a member 65. In the Fig. 4 construction, the outer surface of the nose ring, the casing 54, and the pairs of rings 56, 57 and 61, 63 define a chamber from which there is an annular outlet between the conical end section of the nose-ring and the portion 61a of ring 61. This chamber is provided with an inlet 67 and air forced into the chamber through the inlet escapes between the nose-ring and ring 61. The air cools the nose-ring and then flows around the end of the latter and enters the kiln. The cooling air is supplied in metered quantities and since it is under control, erratic operation of the kiln is avoided.

All forms of the apparatus of the invention include a cooling chamber through which air may be passed in contact with the outer surface of the nose-ring near its end to cool the ring and prevent uneven heating thereof. When an air quenching cooler is employed with the kiln, the air which has been used for cooling the nose-ring may be supplied to the cooler, but, if preferred, the cooling air may be introduced into the chamber around the nose-ring in controlled amounts and then allowed to enter the kiln directly.

In the operation of the apparatus illustrated in Fig. 1, the clinker discharged from the kiln falls upon the upper surface of wall 29 and any fine particles which enter the space between the nose-ring and the wall will pass through passage 30 and enter the cooler. As the kiln expands or contracts with temperature changes, the rings 21 and 22 are continuously urged against the rings 18 and 20 which rotate with the kiln. The air chamber is thus continuously sealed and escape of cooling air into the kiln is prevented. In the Fig. 1 construction, the cooling air is introduced into the cooler, but it will be apparent that it might be used for other purposes, as for heating, or the air could be blown through the chamber by the blower and discharged through conduit 26 into a stack.

In the Fig. 4 construction, the air is forced into the cooling chamber and all the air thus used for cooling is delivered around the end of the nose-ring into the kiln. As the air for cooling purposes is supplied in controlled amounts, the introduction of the cooling air in this manner can be regulated so as not to interfere with the operation of the kiln.

I claim:

1. In a kiln installation including a rotary kiln having a nose ring at its discharge end, the combination of a casing into which the nose ring extends, a pair of longitudinally-spaced, outwardly-extending rings mounted on the nose ring to encircle the latter, a pair of longitudinally-spaced, inwardly-extending rings on the casing engaging respective rings on the nose ring, the pairs of engaging rings defining walls of a substantially closed chamber encircling the nose ring, the casing and nose ring forming the remaining walls of the chamber, and means for causing air to flow through the chamber to cool the nose ring.

2. In a kiln installation including a rotary kiln having a nose ring at its discharge end, the combination of a casing into which the nose ring extends, a pair of longitudinally-spaced, outwardly-extending rings mounted on the nose ring to encircle the latter, a pair of longitudinally-spaced, inwardly-extending rings on the casing engaging respective rings on the nose ring, spring means for holding the rings of the respective pairs in contact, the pairs of engaging rings defining walls of a substantially closed chamber encircling the nose ring, the casing and nose ring forming the remaining walls of the chamber, and means for causing air to flow through the chamber to cool the nose ring.

3. In a kiln installation including a rotary kiln having a nose ring at its discharge end, the combination of a casing into which the nose ring extends, a pair of longitudinally-spaced, outwardly-extending rings mounted on the nose ring to encircle the latter, one of the rings being secured to the nose ring close to its end, a pair of longitudinally-spaced, inwardly-extending rings mounted on the inner wall of the casing to engage respective rings of the first pair, the pairs of engaging rings defining walls of a substantially closed chamber encircling the nose ring, the casing and nose ring forming the remaining walls of the chamber, and means for causing air to flow through the chamber to cool the nose ring.

4. In a kiln installation including a rotary kiln having a nose ring at its discharge end, the combination of a casing into which the nose ring extends, a pair of longitudinally-spaced, outwardly-extending rings mounted on the nose ring to encircle the latter, one of the rings being secured to the nose ring close to its end, a pair of longitudinally - spaced, inwardly - extending rings mounted on the inner wall of the casing to engage respective rings of the first pair, means for maintaining the pairs of rings in contact during rotation of the kiln, the pairs of engaging rings, the nose ring, and the inner wall of the casing defining a substantially closed air chamber, and means for causing air to flow through the chamber to cool the nose ring.

5. In a kiln installation including a rotary kiln having a nose ring at its discharge end, the combination of a casing into which the nose ring extends, a pair of of longitudinally spaced rings mounted movably on the inner wall of the casing and extending toward and encircling the nose ring, a pair of longitudinally spaced rings mounted on the nose ring and encircling the latter, one of said rings lying close to the end of the nose ring, means for holding the movable rings in contact with respective rings on the nose ring as the kiln rotates, the pairs of engaging rings, the inner wall of the casing, and the nose ring defining a substantially closed air chamber encircling the nose ring, said ring on the nose ring adjacent the end of the latter being formed to provide an outlet from the chamber, and means for causing air to flow through the chamber and out through said outlet.

6. In a kiln installation including a rotary kiln having a nose ring at its discharge end, the combination of a casing into which the nose ring extends, a pair of longitudinally spaced rings mounted movably on the inner wall of the casing and extending toward and encircling the nose ring, a pair of longitudinally spaced rings mounted on the nose ring and encircling the latter, one of said rings lying close to the end of the nose ring, means for holding the movable rings in contact with respective rings on the nose ring as the kiln rotates, the pairs of engaging rings, the inner wall of the casing, and the nose ring defining a substantially closed air chamber encircling the nose ring, an inlet and an outlet for the chamber at opposite sides of the axis of the kiln, and means for drawing air through the inlet and chamber and out through the outlet.

7. In a kiln installation including a rotary kiln having a nose ring at its dicharge end, the nose ring including a cylindrical section and a frusto-conical section at its free end, the combination of a casing into which the nose ring extends, an outwardly extending ring mounted at the end of the frusto-conical section of the nose ring and, encircling the latter, a second ring extending outwardly from the nose ring and longitudinally-spaced, inwardly-extending from the first ring, a pair of spaced rings mounted movably on the inner wall of the casing, means for holding the movably mounted rings in contact with respective rings on the nose ring as the kiln rotates, the contacting pairs of rings, the nose ring, and the inner wall of the casing defining a substantially closed air chamber encircling the nose ring, and means for passing air through the chamber to cool the nose ring.

8. In a kiln installation including a rotary kiln having a nose ring at its discharge end, the combination of a casing into which the nose ring extends, two sets of longitudinally-spaced, cooperating sealing means on the casing and nose ring which, with the casing and ring, define a substantially closed air chamber encircling the kiln, means for maintaining the sealing means in effective relation as the kiln rotates and varies in length with temperature changes, and means for causing a flow of atmospheric air through the chamber to cool the nose ring.

JOSEPH B. GAFFNEY.

REFERENCES CITED

The following references are of record in the file of this patent:

UNITED STATES PATENTS

| Number | Name | Date |
|---|---|---|
| 628,940 | Hurry et al. | July 18, 1899 |
| 997,381 | Fasting | July 11, 1911 |
| 1,238,394 | Eldred | Aug. 28, 1917 |
| 1,317,686 | Chappell | Oct. 7, 1919 |
| 1,508,555 | Hults | Sept. 16, 1924 |
| 1,545,055 | Lindhard | July 7, 1925 |
| 1,581,522 | Stehmann | Apr. 20, 1926 |
| 1,606,124 | Hornsey | Nov. 9, 1926 |
| 1,620,989 | Agthe | Mar. 15, 1927 |
| 1,800,247 | Buckbee | Apr. 14, 1931 |